(12) United States Patent
Lee et al.

(10) Patent No.: US 8,586,000 B2
(45) Date of Patent: Nov. 19, 2013

(54) RANDOM GRAPHITE AND FABRICATION METHOD THEREOF USING GRAPHENE NANORIBBON

(75) Inventors: Jae-Kap Lee, Seoul (KR); Jin-Sup Won, Gangwon-Do (KR); Bo-Bae Lee, Gangwon-Do (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/340,839

(22) Filed: Dec. 30, 2011

(65) Prior Publication Data

US 2012/0171109 A1 Jul. 5, 2012

(30) Foreign Application Priority Data

Dec. 30, 2010 (KR) .................. 10-2010-0139525

(51) Int. Cl.
*C09C 1/56* (2006.01)
(52) U.S. Cl.
USPC ......... 423/460; 252/378 R; 977/734; 423/448
(58) Field of Classification Search
USPC ............ 252/378 R; 423/447.1, 447.3, 445 B, 423/DIG. 40, 448, 460
See application file for complete search history.

(56) References Cited

U.S. PATENT DOCUMENTS 7,094,276 B2 * 8/2006 Kojima et al. .................. 96/153

OTHER PUBLICATIONS

Palser, Adam H. R.; "Interlayer interactions in graphite and carbon nanotubes". Phys. Chem. Chem. Phys., 1999, 1, 4459-4464.*
Prudnikava et al. "Raman Characterization of Self-Organized Planar Graphite Layers on the top of Carbon Nanotube Arrays" Physics, Chemistry and Application of Nanostructures Reviews and Short Notes Proceedings of International Conference Nanomeeting. May 2011.*
Graphene Nanoribbon Thin Films Using Layer-by-Layer Assembly Yu Zhu and James M. Tour Nano Letters Oct. 2010 (11), 4356-4362.*
Jing Li, Jang-Kyo Kim, Percolation threshold of conducting polymer composites containing 3D randomly distributed graphite nanoplatelets, Composites Science and Technology, vol. 67, Issue 10, Aug. 2007, pp. 2114-2120, ISSN 0266-3538, 10.1016/j.compscitech.2006.11.010. (http://www.sciencedirect.com/science/article/pii/S0266353806004386).*
Yenny Hernandez, et al; "High-yield production of graphene by liquid-phase exfoliation of graphite" Nature Nanotechnology, vol. 3, Sep. 2008, pp. 563-568; www.nature.com/naturenanotechnology.
J.D. Bernal; "The Structure of Graphite", Proceedings of the Royal Society A; vol. 106 No. 740, Dec. 1, 1924; pp. 749-773.
Jae-Kap Lee, et al; "The growth of AA graphite on (111) diamond", The Journal of Chemical Physics, vol. 129; Issue 23, Dec. 21, 2008; 4 pages.
J. Biscoe, et al; "An X-Ray Study of Carbon Black", Journal of Applied Physics, vol. 13, Issue 6, pp. 364-371; Jun. 1, 1942.

* cited by examiner

*Primary Examiner* — Stuart Hendrickson
*Assistant Examiner* — Richard M Rump
(74) *Attorney, Agent, or Firm* — Ladas & Parry LLP

(57) ABSTRACT

A graphite material and corresponding methods of fabricating the graphite material from graphene nanoribbons are described. The graphite material is composed of a multiplicity of graphene nanoribbons which are randomly layered on each other. The graphene nanoribbons are less than 0.4 nm thick, 5 nm wide, and 20 nm long. One variant of the method of fabricating the graphite material includes preparing graphene nanoribbons, suspending the graphene nanoribbons in a solvent, and then drying the suspension to fabricate the graphite material and to drive off the solvent.

20 Claims, 5 Drawing Sheets

RANDOM GRAPHITE AND FABRICATION METHOD THEREOF USING GRAPHENE NANORIBBON

CROSS-REFERENCE TO RELATED APPLICATION

The present disclosure relates to subject matter contained in priority Korean Application No. 10-2010-0139525, filed on Dec. 30, 2010, which is herein expressly incorporated by reference in its entirety.

BACKGROUND OF THE INVENTION

1. Field of the Invention

This specification relates to a carbon material and a fabrication method thereof, and particularly, to random graphite comprising graphene layers, which are three-dimensionally random in the random graphite, and a fabrication method is thereof using graphene nanoribbons.

2. Background of the Invention

Crystalline structures of graphite are classified according to stacking structures of graphene layers (FIGS. 1 and 2). Since graphite having an AB-stacked structure (hereinafter, referred to as AB graphite) was reported in 1924 [Bernal et al, Proc. Roy. Soc. London, Ser. A 106, 749-773 (1924)], AB graphite (inter-layer spacing is 3.35 Å) has been known as the unique crystalline graphite. Also, the present inventor et al have reported presence of AA' graphite (inter-layer spacing is 3.43-3.44 Å) [Lee et al, The Journal of Chemical Physics 129, 234709 (2008)].

AA graphite having an AA-stacked structure (theoretical inter-layer spacing is about 3.53 Å) can exist crystallographically. However, AA graphite cannot exist in nature because the AA stacking of graphene layers is unstable energetically, and is temporarily observable when Li atoms are intercalated into AB-stacked graphite.

Meanwhile, turbostratic graphite (inter-layer spacing is 3.41-3.45 Å) has been reported in 1942 [J. Biscoe et al, Journal of Applied Physics 13 (1942) 364], and it is commonly known that turbostratic graphite has a structure that graphene layers are stacked parallel without any structural regularity between the layers. That is, the graphene layers of turbostratic graphite are parallel, but rotated each other (FIG. 2D). Therefore, turbostratic graphite can exhibit a clear and strong (002) peak on an X-Ray diffraction (XRD) pattern.

All types of graphite reported previously, as shown in FIG. 1, are building blocks of parallel stacked graphene layers which are slid (AB, AA and AA' graphites) or rotated (turbostratic graphite) and show a typical X-ray diffraction (XRD) pattern where a clear and strong (002) peak appears at 2θ=25.9° to 26.6°. This is the reason why graphite is named as an layered material. Meanwhile, amorphous carbon (or amorphous graphite) can be defined as a graphitic material in which graphene layers are not developed (thus, all XRD signals including (200) peaks are). All types of crystalline graphite are typically fabricated at a high temperature over about 2000° C.

SUMMARY OF THE INVENTION

An aspect of the detailed description is to provide graphite with a new structure in which graphene layers are three-dimensionally random, and a fabrication method thereof at a low temperature as below 100° C.

To achieve these and other advantages and in accordance with the purpose of this specification, as embodied and broadly described herein, there is provided random graphite where graphene layers exist disorderly three-dimensionally.

A fabrication method for a random graphite according to the present disclosure may comprise (a) preparing graphene nanoribbons, (b) forming a graphene solution by distributing the graphene nanoribbons in an organic solvent, and (c) drying the graphene solution to fabricate random graphite.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Random graphite according to the present disclosure comprises graphene layers which exist three-dimensionally random. An average inter-layer distance of the random graphite measured by an XRD analysis may be 3.48 Å. The spacing is between those of AB graphite (3.35 Å) and AA graphite (3.53 Å), and is larger than that of AA' graphite, 3.43-3.44 Å.

Figure 4:
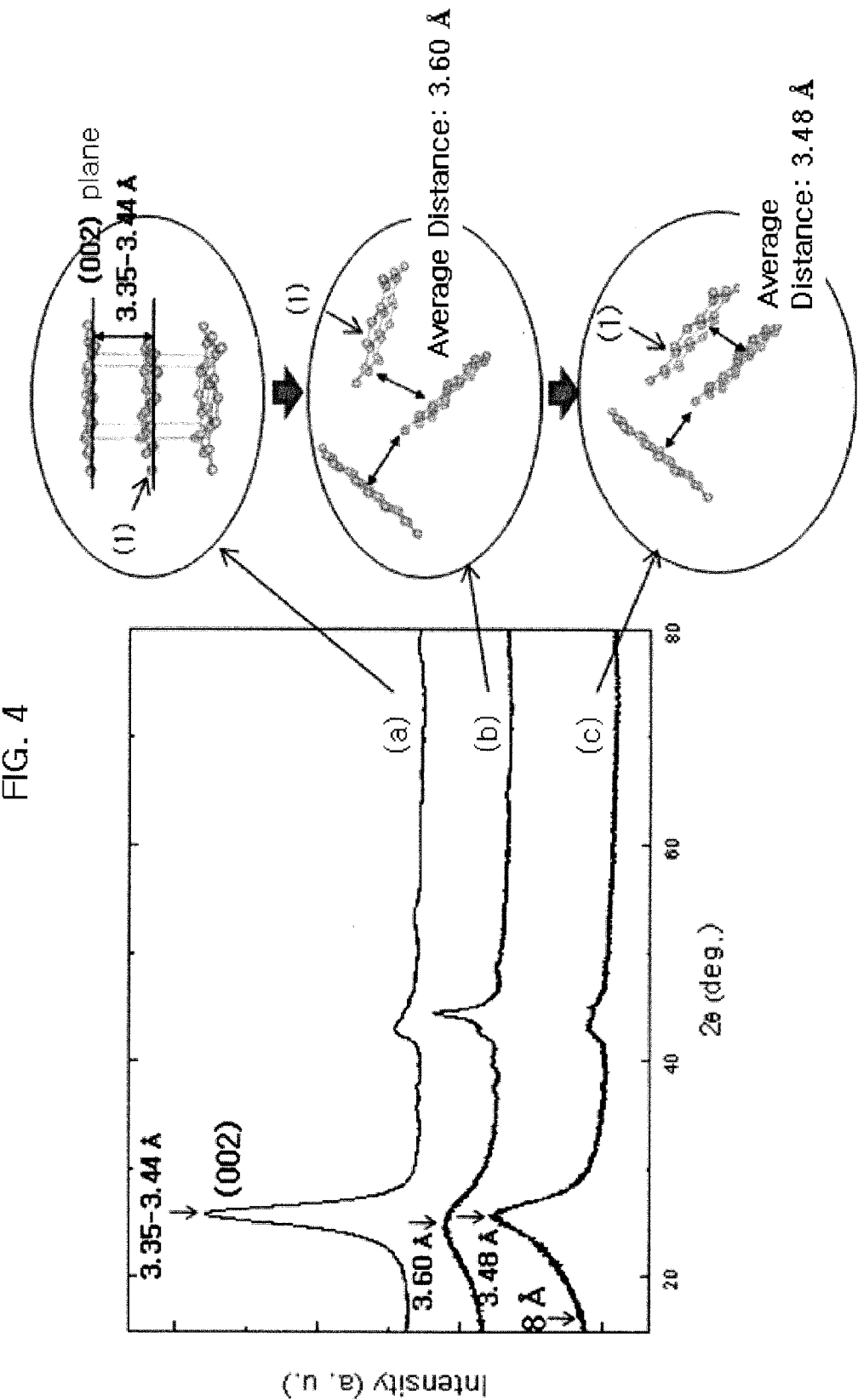
FIG. 4 is a diagram showing XRD patterns and structures, wherein (a) shows crystalline graphite, (b) shows graphene nanoribbon, and (c) shows random graphite of the present disclosure.
Figure 5:
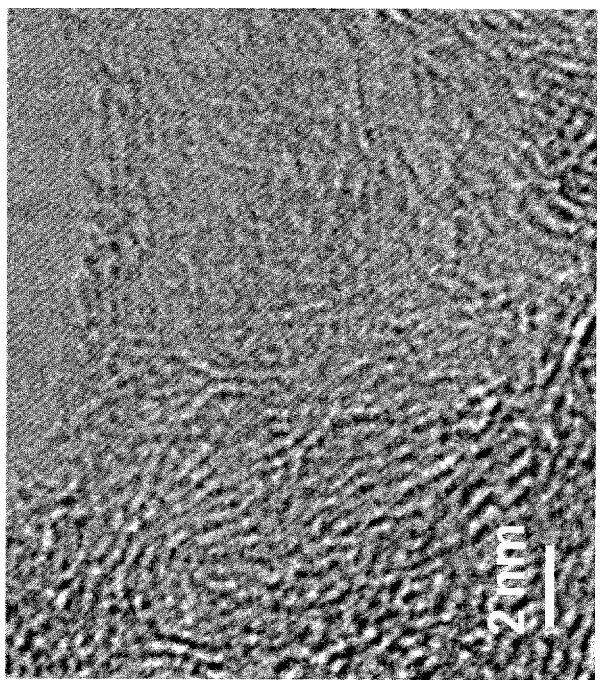
FIG. 5 is a diagram showing a Transmission Electron Microscopic (TEM) image of random graphite according to the present disclosure.

The (002) peak in the XRD pattern for random graphite appears at 2θ=25.6° and may be asymmetric (See, the graph of FIG. 4).

A fabrication method for random graphite according to the present disclosure may comprise three steps (see FIG. 3), (a) preparing graphene nanoribbons, (b) forming a graphene suspension by dispersing the graphene nanoribbons in an organic solvent, and (c) drying the suspension to fabricate random graphite containing graphene layers, which are three-dimensionally random.

The organic solvent may be any one of alcohol, acetone, DMF, and combinations thereof, and the graphene nanoribbons may be less than 20 nm in length.

The step (b) can be performed by an ultrasonic treatment to distribute fully the graphene nanoribbons in the solvent, and the step (c) may be performed at a temperature range between room temperature (20° C.) and 200° C.

Hereinafter, each step will be described in more detail.

The graphene nanoribbons as a basic material used in the present disclosure may be obtained by physical decomposition of graphite in a shape of a helix (composed of graphene helices). The graphene nanoribbons may be less than 0.4 nm in thickness (namely, pure graphene), and less than 5 nm in width, less than 20 nm in length (generally less than 10 nm). The presence of the graphene nanoribbons can be confirmed by XRD analysis, shown in (a) and (b) of FIG. 4. The sharp (002) peak of (a) in FIG. 4 exhibited in the crystalline graphite became broadened, demonstrating that the graphene layers of the ordered structure (a) were decomposed and scattered randomly.

Figure 1:
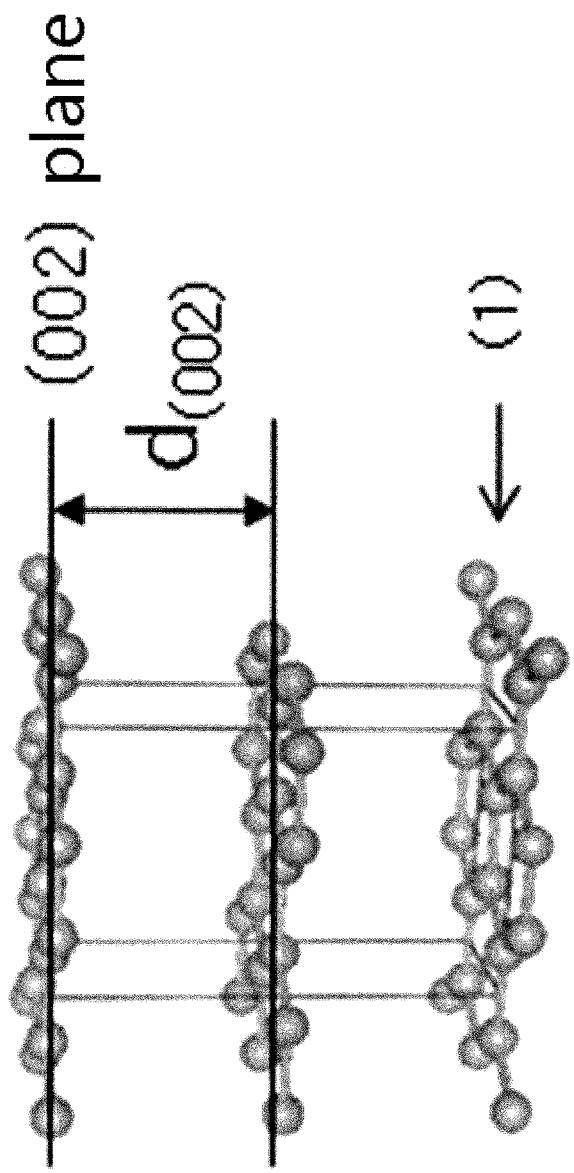
FIG. 1 is a diagram of graphite which is composed of parallel graphene layers.
Figure 2:
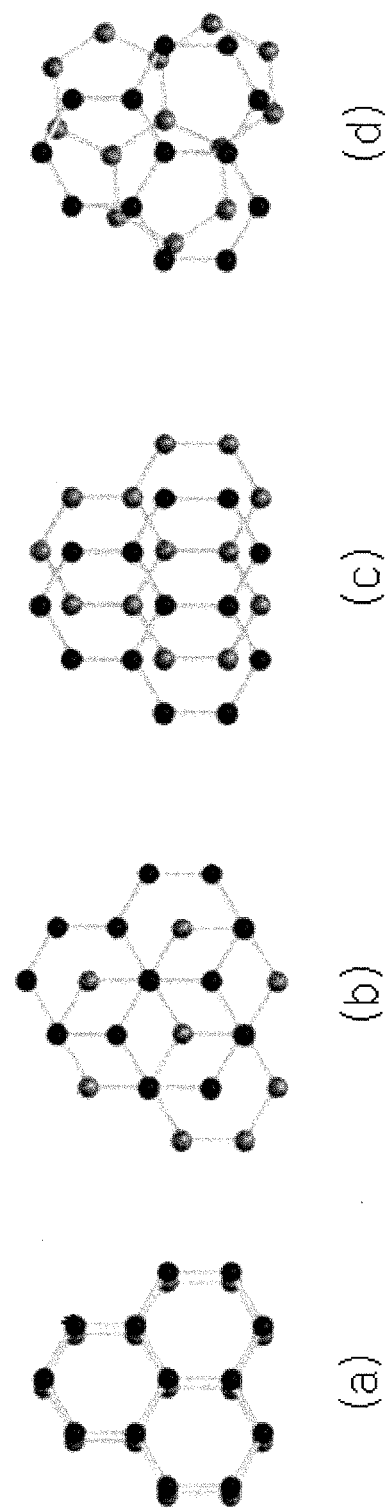
FIG. 2 is diagram showing types of graphite reported which are determined by stacking structures of graphene layers, wherein (a) shows AA graphite, (b) shows AB graphite, (c) shows AA' graphite and (d) shows turbostratic graphite.
Figure 3:
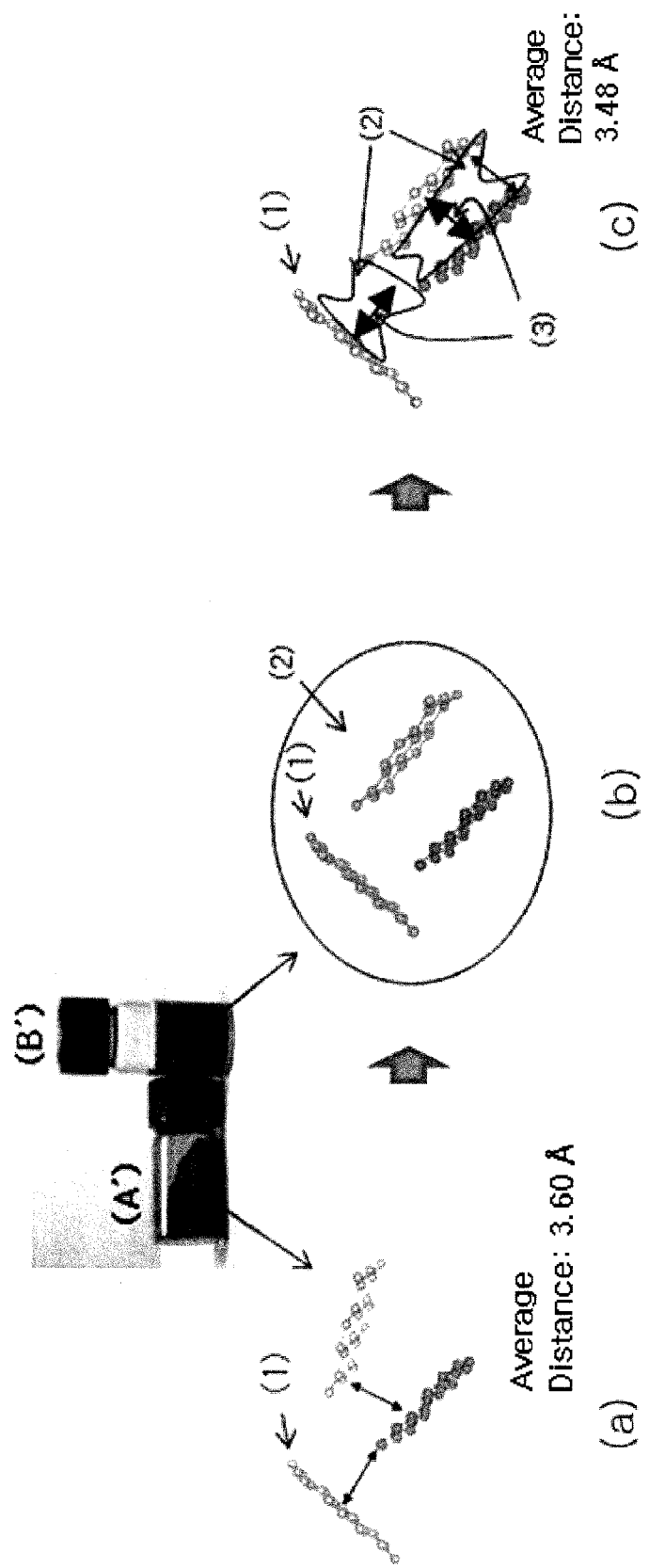
FIG. 3 is a diagram showing steps of a fabrication process for random graphite according to the present disclosure, wherein (a) shows graphene, (b) shows graphene suspension, and (c) shows random graphite.

The thusly-prepared graphene nanoribbons are uniformly distributed in an organic solvent 2 to create a distributed solution (graphene suspension). The following embodiment has used alcohol as the organic solvent, but the present disclosure may not be limited to that. An ultrasonic treatment may be performed for the distributed solution, thereby preparing a distributed solution in which the graphene nanoribbons are uniformly distributed in the alcohol ((b) of FIG. 3). (A') and (B') of FIG. 3 are photos of distributed solutions, respectively, fabricated by distributing the prepared graphene nanoribbons into the organic solvent.

Upon drying the graphene suspension, the graphene nanoribbons, which were randomly suspended in the solvent, are closely adhered each other by a strong surface tension (affinity) 3 of alcohol between graphene sheets, keeping a theoretical distance, thereby forming "random graphite". Random graphite comprises graphene layers, which are three-dimensionally random, like the case in the suspension ((c) of FIG. 3).

In the meantime, the temperature for drying the graphene suspension is not an important variable. The samples can be dried in a conventional oven where available temperatures range between room temperature (20° C.) and 200° C.

The characteristic of the random graphite of the present disclosure is that a $d_{(002)}$ value of the (002) peak in the XRD is about 3.48 Å, namely, larger than is that of the crystalline graphite (3.35-3.45 Å). The randomly stacked graphene nanoribbons partially have AB, AA' and AA stacked structures (each theoretical stacked distance, namely, $d_{(002)}$ is 3.35 Å, 3.43 Å and 3.53 Å), accordingly, the value may be predictable from an average value of the stacked distances. That is, the graphene nanoribbons three-dimensionally randomly exist in the random graphite, but the random graphite can have every type of stacked structure of AB, AA', AA (graphene is slid) or turbostratic (graphene is rotated). Also, since the graphene nanoribbons are present randomly, the random graphite can have a space less than 1 nm (see 8 Å indicated at the left of the (002) peak in (c) of FIG. 4). Of course, the random graphite may also partially have an empty space broader than 1 nm. Another characteristic of random graphite is that the (002) peak in the XRD pattern, as shown in (c) of FIG. 4, is asymmetric. The method may further comprise (d) performing a post-heat treatment for the random graphite at temperature lower than 1500° C. after the step (c). The additional post-heat treatment may improve crystallinity of graphene sheets comprising random graphite Random graphite may have a large volume of an empty space due to the feature of the presence of the three-dimensionally random graphene nanoribbons. Thus, it can be applied to Graphitic Intercalation Compound (GIC) such as electrodes for Li-ion battery.

Example

Hereinafter, the example of the present disclosure will be described in detail. Here, the example may be merely illustrative to help easier understanding of the present disclosure, and the present disclosure may not be limited to the example.

Example 1

After preparing 5 g of graphene nanoribbons (i.e., pure graphene with a thickness of ~0.4 nm) which were less than 5 nm in width and less than 10 nm in length, the graphene nanoribbons were put into 1000 cc of alcohol, followed by an ultrasonic treatment for 10 minutes, thereby creating a graphene suspension (a distributed state of this suspension was maintained for more than 3 months, and see (B') of FIG. 3). This suspension was dried in a oven kept at 100° C.

The dried graphite material was black and exhibited a granular form with a size of several hundred μM, so it was similar to the existing graphite as it appeared. According to the XRD analysis ($\lambda$=1.541 Å) for this material, as shown in (c) of FIG. 4, the d-value of the asymmetric (002) peakly was measured to be 3.48 Å. A Transmission Electron Microscopic (TEM) analysis of the random graphite showed that graphene layers less than several nm in length were randomly present (also, graphene layers stacked in parallel are observable partially). Grain boundaries were not observed. The XRD and TEM data demonstrate that the material is random graphite. There were no XRD and morphological changes with increasing the drying temperatures of the graphene suspension from the room temperature to 250° C.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A graphite material comprising:
a plurality of graphene nanoribbons randomly layered on each other, wherein the graphene nanoribbons comprise a thickness of less than 0.4 nm, a width of less than 5 nm, and a length of less than 20 nm.

2. The graphite material of claim 1, wherein the graphite material comprises an average inter-layer spacing of about 3.48 Å as measured by an X-ray diffraction (XRD) analysis.

3. The graphite material of claim 1, wherein the graphite material comprises an average 2θ value of 25.6° of a (002) peak as measured by an XRD analysis ($\lambda$=1.541 Å).

4. A method for fabricating a graphite material, the method comprising:

(a) preparing graphene nanoribbons that comprise a thickness of less than 0.4 nm, a width of less than 5 nm, and a length of less than 20 nm;
(b) forming a graphene suspension by ultrasonicating the graphene nanoribbons in an organic solvent; and
(c) drying the graphene solution to fabricate the graphite material.

5. The method of claim 4, wherein the organic solvent is alcohol, acetone, DMF, or combinations thereof.

6. The method of claim 4, wherein the step (c) is performed at a temperature range between room temperature and 200° C.

7. The method of claim 4, comprising further step (d) after the step (c), and the step (d) is performing a post-heat treatment for the random graphite at temperature lower than 1500° C.

8. The method of claim 4, wherein an average inter-layer spacing measured by X-ray diffraction (XRD) analysis for the random graphite is 3.48 Å.

9. The method of claim 4, wherein an average $2\theta$ value of a (002) peak by an XRD analysis ($\lambda$=1.541 Å) for the random graphite is 25.6°.

10. A method for fabricating a graphite material, the method comprising:
preparing graphene nanoribbons that comprise thicknesses of less than 0.4 nm, widths of less than 5 nm, and lengths of less than 20 nm;
ultrasonicating the graphene nanoribbons in an organic solvent to forming a graphene suspension;
heating the graphene suspension above 20° C. and below 200° C. to dry the graphite material; and
performing a post-heat treatment on the graphite material at a temperature above 200° C. and below 1500° C.

11. The method of claim 10, wherein heating the graphene suspension is at about 100° C.

12. The method of claim 10, wherein heating the graphene suspension is at about 190° C.

13. The method of claim 10, wherein performing the post-heat treatment on the graphite material is at about 500° C.

14. The method of claim 10, wherein performing the post-heat treatment on the graphite material is at about 800° C.

15. The method of claim 10, wherein performing the post-heat treatment on the graphite material is at about 1000° C.

16. The method of claim 10, wherein performing the post-heat treatment on the graphite material is at about 1400° C.

17. The method of claim 10, wherein the organic solvent comprises alcohol, acetone, DMF, and combinations thereof.

18. The method of claim 10, wherein the organic solvent comprises alcohol.

19. The method of claim 10, wherein the organic solvent comprises acetone.

20. The method of claim 10, wherein the organic solvent comprises DMF.

* * * * *